June 7, 1966  C. N. KLAHR  3,255,083
METHOD OF FLUX SEPARATION IN NUCLEAR
REACTORS AND STRUCTURE THEREFOR
Filed Dec. 26, 1962

INVENTOR
Carl N. Klahr

BY Clive H. Bramson

ATTORNEY

United States Patent Office 3,255,083
Patented June 7, 1966

3,255,083
METHOD OF FLUX SEPARATION IN NUCLEAR REACTORS AND STRUCTURE THEREFOR
Carl N. Klahr, Brooklyn, N.Y.
(678 Cedar Lawn Ave., Lawrence, N.Y.)
Filed Dec. 26, 1962, Ser. No. 247,020
8 Claims. (Cl. 176—17)

This invention relates generally to nuclear reactors and more particularly to the subjection of adjacent regions of fuel elements thereof to thermal neutron fluxes of substantially different magnitudes.

Pursuant to presently known principles, substantial thermal flux differentials among adjacent fuel element regions has been achieved by surrounding appropriate regions with strong neutron absorbing materials, the attendant disadvantage, however, being the appreciable decrease in reactivity of the system, a disadvantage usually vastly outweighing any concomitantly accruing advantages.

In accordance with the present invention, however, a flux separator (internal reflector), which need not be a neutron absorber, is suitably positioned between adjacent regions of appropriate composition, whereby a decoupling of the fluxes and the power levels in said adjacent regions is accomplished by reflection of neutrons rather than by neutron absorption.

Prior to advancing to the description of the present invention, it is deemed desirable to first briefly review several of the properties, qualities and characteristics of nuclear reactors in general, such review being expedient to an understanding of this invention.

Of basic import to the operation of a reactor is criticality, the ability to sustain a continued chain reaction. The meaure of criticality is reactivity, i.e., the mean number of neutrons produced by the reactor per neutron absorbed. When the reactivity is unity the chain reaction is sustained and the reactor is critical; when the reactivity is less than unity the reaction tends to die down quickly; when it is greater than unity it tends to build up quickly and must be controlled.

Neutrons generated by fission tend to have high energies of a few million electron volts. These fast neutrons have a low probability of producing further fissions in uranium-235 which is a principal fissionable material. When the neutrons have been, by a moderator, slowed down to thermal energies, i.e., neutrons at or near thermal equilibrium with the surrounding medium, their capability to produce further fissions is greatly enhanced. Most reactors depend upon thermal neutrons to produce the bulk of their fissions.

Reactivity is a function of the following factors: (1) the size and shape of the fuel elements; (2) the total number of fuel elements; (3) the relative spacing of the fuel elements; (4) the amount of moderator in the reactor (volume ratio of moderator to fuel in the lattice); (5) the number, size and geometric arrangement of control and structural elements in the reactor; (6) the general geometric arrangement of the foregoing elements in the reactor core; (7) the degree of burn-up of the fuel element due to consumption of the U–235 and production of fission products which absorb neutrons; (8) the reactor temperature; and (9) the degree of enrichment of the fuel elements in fissionable material, i.e., the proportion of highly fissionable U–235 to U–238.

In applying the foregoing reactivity factors to the end of achieving maximum economy and utility, consideration is also given to the following limiting and qualifying factors:

(1) *High power density*, expressed in kilowatts per cubic centimeter of core, or other appropriate units. While the peak allowable power density is limited by the ability of the coolant to remove heat from the fuel elements, the average power density depends upon the spatial distribution of the neutron density or of the neutron flux, i.e., the product of neutron density and speed. The average power density further depends upon the spatial distribution of the U–235 fuel, as determined by the location of the fuel elements and variations in the enrichment of these fuel elements; average power density being usually substantially lower then the peak power density, a relationship expressed by the average to maximum power density value of the reactor.

(2) *Lifetime*, expressed as the number of megawatt days, or other appropriate units of power that a reactor core can produce before burn-up effects render the nuclear reactor non-critical, due to consumption of U–235 and the production of fission products which absorb neutrons. This limitation is called the reactivity lifetime limitation in the reactor core. Mechanical damage to the fuel elements by continued irradiation which may occur prior to reaching the burn-up limitation, further limits reactor lifetime. Such damage applies particularly to metallic uranium fuel elements, uranium oxide showing much less mechanical damage. This limitation is called the radiation damage limitation with respect to the length of use of the fuel elements within the reactor core.

(3) *Utilization of inexpensive fuel elements*, e.g., low enrichment fuel elements, or other fuel elements which can be fabricated economically.

(4) *Control of the reactor*, which includes simplicity of start-up and shut-down of the reactor by means of the control elements and further includes provision of sufficient reactivity to override short-term and long-term effects which tend to render the reactor non-critical, the principal short-term effect being the growth of radioactive xenon in the fuel elements immediately following shut-down, xenon-135 being a fission product which is characterized by a high probability of absorbing neutrons. Accordingly, unless considerable excess reactivity is built into the reactor, and compensated by control rods during normal operation, substantial time periods must expire following shut-down to permit the radioactive xenon to decay prior to re-starting the reactor. The principal long-term effects the control system must override are burn-up effects due to consumption of U–235 and fission product generation and reactivity effects due to temperature variations.

Of special import are the deleterious effects produced by the control system itself. Significantly with respect to the size and cost of the reactor, additional fuel elements are required to give long lifetime and xenon override. Control elements further distort the neutron flux distribution and lower the average power density. The control system absorbs a considerable fraction of the neutrons in a non-productive manner and the complexity thereof may lead to dangers due to malfunction thereof.

(5) *The size of a reactor* and the capital investment thereof being clearly related, it is obviously desirable that the size thereof be minimized to the end of practicability.

(6) The higher *the coolant exit temperature*, the greater the thermodynamic efficiency of conversion of nuclear energy (in the form of heat) into electrical energy. The allowable coolant exit temperature depends both upon the nature of the coolant and upon the material composition and mechanical structure of the fuel elements. Generally, high temperature fuel elements must be fabricated of materials which tend to lower the *reactivity contribution of the fuel element*. This in turn, increases the cost of the fuel element, increases the required size of the reactor core, and leads to a shorter lifetime, with respect to reactivity endurance, for the reactor core loading.

An object of the present invention resides in the provision of substantial increased reactor lifetime without largely increasing the enrichment of the fuel elements being consumed; without largely increasing the size or cost of the reactor; and without increased difficulties in reactor control.

Another object of the instant invention is to enable the use of relatively inexpensive fuel elements in a reactor without increasing reactor size or decreasing reactivity life.

A further object of the present invention is to provide simple and effective means of controlling the reactor to provide sufficient excess reactivity for xenon override, long term burn-up and temperature effects, and other control requirements, without the usual requirement of an enlarged core to provide excess reactivity, or of highly enriched fuel elements.

A still further object is to provide means of controlling the reactor without the usual distortions produced by control rods in the neutron flux spatial distribution which tend to lower the average power density.

Another object of the instant invention is to provide means allowing the use of fuel elements less susceptible to radiation damage exposure and having high temperature properties, said fuel elements having high performance qualities notwithstanding the penalties in neutron absorption from which these fuel elements suffer.

Still another object of the present invention resides in the provision of increased average power density of the reactor without decreasing the reactivity lifetime and without requiring the use of relatively expensive fuel elements of high enrichment.

Other objects, features, and advantages of the invention will become apparent from a study of the following specification, taken in conjunction with the accompanying drawings wherein.

Essentially, the present invention is directed to nuclear reactor designs wherein the power or thermal neutron flux is set at a different level in each respective region of the reactor. To the end of uncoupling the fluxes of the high thermal flux regions and the low thermal flux regions, an internal reflector is herewith employed, thereby separating one region from another to limit the leakage of thermal neutrons from the high thermal flux region to the low thermal flux region.

Figure 1:
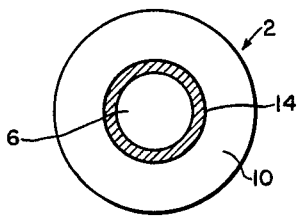
FIGURE 1 is a cross-sectional view of a cylindrical reactor core having a circular inner region, said inner region being surrounded by an internal reflector.
Figure 2:
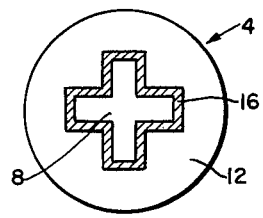
FIGURE 2 is a cross-sectional view of a cylindrical reactor core having a cross-shaped inner region, said inner region being surrounded by an internal reflector.

Referring now to FIGURES 1 and 2 of the drawings, reactor cores 2 and 4 having circular and cross-shaped inner regions 6 and 8, respectively, are shown. Inner regions 6 and 8 of said cores are low thermal flux-high enrichment regions; outer regions 10 and 12 being high thermal flux low enrichment regions, internal reflectors 14 and 16 being the flux separators, respectively. In the low thermal flux regions 6 and 8 (low power regions), the ratio of fast flux to thermal flux is large, this being achieved by using a low moderator volume ratio and a high volume ratio of fuel and structural material, and a highly enriched fuel. In the high thermal flux regions 10 and 12 (high power regions), the ratio of fast flux to thermal flux is much lower than in respective regions 6 and 8, this being achieved by using a higher volume fraction of moderator and a low enrichment fuel. In the event, e.g., low flux region 6 is positioned adjacent high flux region 10 without an internal reflector therebetween, the fluxes in the two regions would tend to equalize because of thermal neutron leakage from region 10 into region 6 and further because of fast neutron leakage from region 6 into region 10. By virtue of the present invention, however, neutron leakage between the aforesaid regions is minimized by placement of a slab or other suitable geometric form of neutron reflecting material 14 between regions 6 and 10, the neutrons from each region being substantially reflected back into their respective regions of emanation.

By way of illustration it will be appreciated that for an internal reflector slab having a thickness T, the ratio of thermal fluxes is given by the following expression (in accordance with diffusion theory), when the neutron absorption within the internal reflector is negligible:

$$\phi(1) = \frac{\phi(2)}{1 + \frac{3T}{L}c(1)}$$

where (1) is the flux in the low flux region 6 at the interface with the internal reflector 14, (2) is the flux in high flux region 10 at the interface with the internal reflector 14, L is the neutron mean free path between collisions, and C(1) is the ratio $$C = \frac{\text{neutron current}}{\text{neutron flux}}$$

at the interface of region 6 with the internal reflector. The value of C depends on the probability that a neutron crossing over into region 6 for the first time will eventually return to the internal reflector. This probability is called the albedo of region 6. It has been shown that when region 6 is a very strong neutron absorber, the albedo is zero and C(1) is approximately given by $$C(1) = \frac{1}{\sqrt{3}}$$

Using this value of C(1), and taking the internal reflector to be 5 mean free paths thick, the following obtains:

$$\frac{\phi(1)}{\phi(2)} = \frac{1}{9.65}$$

Thus, the flux separator can maintain a thermal flux ratio of almost 10 to 1. This calculation, as stated, is based upon diffusion theory; results of more exact calculations being presented in Table I hereinbelow, said calculations being based on calculations for the Milne Problem by C. Mark, see Physical Review 72, page 563 (1947):

It will be understood that the effectiveness of the flux separator relates not only to its thickness T, but additionally to C(1), which depends on the albedo of the low flux region. When the albedo is near unity, C(1) is approximately zero and the thermal flux ratio is close to unity. It can be shown that C, which can be expressed as the ratio of the neutron diffusion coefficient to the flux extrapolation length, is given by the following approximate expression:

$$C = \frac{1}{\sqrt{3}} \cdot \frac{1-A}{1+A}$$

where A is the albedo.

TABLE 1

Internal Reflector Thickness in
Neutron Mean Free Path:    Flux Separation Ratio
1 ------------------------------------- 2.94
2 ------------------------------------- 4.75
3 ------------------------------------- 6.48
4 ------------------------------------- 8.25
5 ------------------------------------- 10.00

Just as the internal reflector 14 maintains a larger thermal flux in region 10 because the albedo of a thermal neutron entering region 6 is small, so does it also maintain a higher fast flux in region 6 than in region 10, because the albedo of a fast neutron entering region 10 from region 6 is small. Similarly with respect to the fast flux $\phi_F(2)$ and $\phi_F(1)$ as given above for thermal flux, $$\phi_F(2) = \frac{\phi_F(1)}{1 + \frac{3T}{L_F}C(2)}$$

where $\phi_F(2)$ is the fast flux at the interface of region 10 and the internal reflector; $\phi_F(1)$ is the fast flux at the interface of region 6 and the internal reflector; is the fast neutron mean free path; $C(2)$ is the ratio of current to flux for fast neutrons at the interface of region 10 and the internal reflector.

It will be appreciated that region 6 will have poor moderating properties because the moderator volume ratio within it is chosen to be relatively small. The internal reflector will also be a poor moderator, such that the volume of internal reflector material will contribute little to the thermalization of the fast neutrons produced in region 6. As a result the thermal fissions in region 6 will result substantially from thermal neutrons which have leaked into region 6 from region 10 through the internal reflector. The fast neutrons produced in region 6 will not be thermallized therein. Most of them will eventually leak through the internal reflector into region 10 where they will be thermalized and eventually lead to fission, thus contributing to the chain reaction.

With a large ratio of $\theta(2)$ to $\theta(1)$, only a small fraction of the power will be produced in region 6, said region being extremely important, however, in producing excess neutrons which leak into region 10 to perpetuate the chain reaction. Thus, region 6 will contribute substantially to the reactivity of the configuration shown in FIGURE 1.

The fission rate in region 6 will be critically dependent upon the leakage rate of thermal neutrons from region 10 into region 6 through the internal reflector. For given region compositions, the leakage rate can be controlled by varying the thickness of the internal reflector, this structural effectuation becoming an important control element of the reactor. A more detailed disclosure of this feature of the invention will be given hereinbelow with reference to FIGURES 5 and 6 of the drawings. Briefly at this time, however, it will be realised that if the reactivity contribution of region 6 of FIGURE 1 to the reactivity configuration is substantial, variation of the internal reflector 14 thickness will be a very sensitive means of reactor control. It will provide the added advantage of effectuating reactor control without parasitic absorption of neutrons in the manner of control rods composed of neutron absorbing material, since the internal reflector controls the chain reaction by preventing access of the thermal neutrons to the high reactivity inner region rather than by absorbing the thermal neutrons.

The primary effects of the internal reflector as a separator between high thermal flux and low thermal flux regions are summarized as follows:

(1) The high thermal flux regions produce most of the fissions.

(2) The low thermal flux regions produce excess fast neutrons which leak into the high thermal flux regions.

(3) The thermal flux and fast flux in the two regions are decoupled from each other.

(4) The leakage of fast neutrons from the low thermal flux region controls the chain reaction. Hence, reactor control can be maintained by varying the leakage from one region to the other. That is, increasing the leakage increases the reactivity and vice versa.

The import of these effects resides in the number of innovations and improvements in reactor design accomplishable by dint of internal reflector flux separator utilization together with appropriate selection of region composition.

In one respect, therefore, increased reactivity lifetime can be attained without a significant increase in the enrichment of the fuel elements being consumed, without appreciable increase in the size or cost of the reactor and without increased difficulties in reactor control. Increased reactor lifetime is accomplished by employing the designs heretofore described with reference to FIGURES 1 and 2 of the drawings wherein an inner core region of highly enriched fuel elements and low moderator to fuel volume ratio is enclosed in an internal reflector of appropriate thickness to maintain a much larger thermal flux in the outer core region, whose fuel elements are relatively unenriched, than in the inner fuel region. Since the thermal flux in the inner region is low substantially all the power will be produced in the outer region, substantially all fuel burnup being effected in the outer region. As burnup proceeds, reactivity according to said configurations diminishes, an increase thereof being accomplished by decreasing the thickness of the internal reflector to thus permit more thermal neutrons to leak into the inner core region and thus increase its power density. This further increases the fraction of neutrons leaking into the outer region, and therefore compensates for the burnup of the outer region.

With respect to economy considerations it will be appreciated that by reason of the instant invention, utilization of relatively inexpensive fuel elements of low enrichment without the disadvantages of large reactor size and low reactivity lifetime is made practicable. As heretofore described with reference to FIGURES 1 and 2, the outer power producing region consists of the low enrichment fuel, the inner region having a relatively low thermal flux as compared with the outer region by virtue of the flux separation action of the internal reflector. Accordingly, the low enrichment outer region produces most of the reactor power, its fuel elements thus experiencing a higher rate of burnup than those fuel elements in the high enrichment inner region. The fission rate in the inner region will be governed by the leakage of thermal neutrons into it through the internal reflector since the inner region does not itself substantially produce thermal neutrons. The inner region, although it produces a small fraction of the fissions in the reactor, is vitally important in that its relatively small fraction of fissions produce the excess neutrons which maintain the chain reaction. That is, the inner region, because it is composed of high enrichment fuel elements, provides a large contribution to the reactivity of the reactor notwithstanding its small power production.

Because of the high reactivity of the inner region, it is not necessary to make the reactor especially large in order to raise its reactivity to compensate for the low enrichment fuel elements in the outer region. These low enrichment fuel elements are sufficiently compensated by the high reactivity inner region. Actually the outer region fuel elements may be of such low enrichment that the reactor could not be critical even for infinite size with such fuel elements unless the high enrichment inner region is provided.

Figure 5:
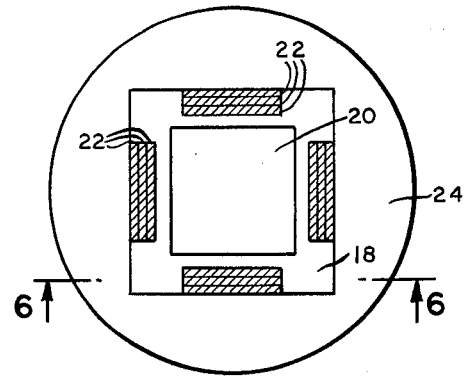
FIGURE 5 is a cross-sectional view of a cylindrical reactor core having a rectilinear inner region, said inner region being surrounded by movable internal reflector sections.
Figure 6:
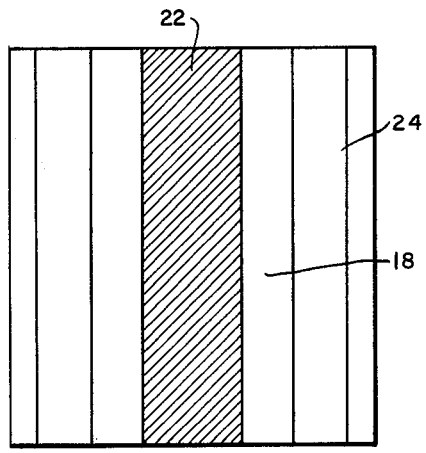
FIGURE 6 is a side elevational view taken along line 6—6 of FIGURE 5.

It will be evident in the light of the foregoing that the present invention provides simple and effective means of controlling the reactor to provide sufficient excess reactivity for xenon over-ride, for long term burnup and temperature effects and other control requirements. A most effective reactor controlling device according to this invention is the provision of mechanical means, as illustrated in FIGURES 5 and 6, for varying the thickness of the internal reflector. As observed in said figures, internal reflector 18 surrounding high enrichment fuel region 20 is comprised of movable sections 22, respectively superposed in slidable relation, said sections forming a part of said internal reflector. It will be understood, however, that other suitable configurations achieving variations in the thickness of the internal reflector are within the contemplation of the instant invention. Thus, it will be appreciated that the degree of flux separation between high and low enrichment fuel regions 20 and 24, respectively, can be achieved, the thickness of the internal reflector controlling the leakage of thermal neutrons into the inner region and of fast neutrons into the outer region. Decreasing the internal reflector thickness increases the reactivity of the configuration, and very substantial increases can be obtained by making substantial decreases in the reflector thickness. It will be further understood that a decrease in the internal reflector thickness, in addition to increasing the reactivity, will change the power sharing ratio between the inner enriched core region and the outer relatively unenriched core region since the thermal flux ratio is controlled by the internal reflector thickness. While changes in the power sharing ratio may not be disadvantageous for some purposes, e.g., temporary changes as xenon override, avoidance thereof may be desirable in attaining other design objectives. Accordingly, the provision of conventional neutron absorber control elements, either within the internal reflector itself or within the inner core region may be embodied. It will be noted that conventional control rods will be much more effective in the internal reflector than in the conventional reactor design in view of the enhancement of reactivity control in the internal reflector. Further, conventional control elements will be more effective in the inner core region of the instant internal reflector embodiment than in a conventional reactor design because of the enhanced reactivity contribution of the inner core region.

It will be evident the present invention permits the use of fuel elements affording; high permissible radiation damage effects, e.g., uranium oxide fuel; high corrosion resistance, e.g., stainless steel cladding; and good mechanical properties at high temperatures. Absent the utilization of internal reflectors as disclosed herein, these high performance qualities are usually due to the use of materials or fabrication principles which are relatively inefficient with regard to neutron economy. Use of such fuel elements is usually accompanied by considerable penalties in reactivity which result in a low reactivity lifetime for the core, or require a large reactor core, or require that the fuel be highly enriched. According to the methods of this invention, such fuel elements can be used in the outer (relatively low reactivity) region of the core, which produces most of the reactor power. The normal reactivity penalties of such fuel elements are compensated by the high enrichment inner region in the manner heretofore described. Thus, high performance fuel elements can provide almost all the reactor power without the normal reactivity penalties of such fuel elements.

Figure 4:
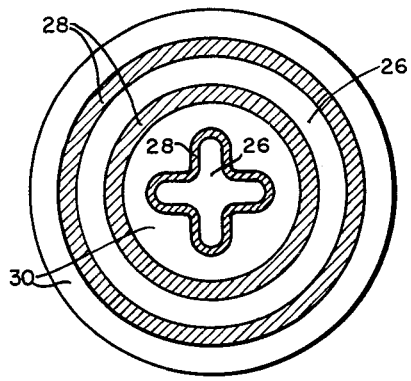
FIGURE 4 is a cross-sectional view of a cylindrical reactor core having a centrally disposed irregularly shaped region and two concentric circular regions, each region being separated by an internal reflector.

The principles of this invention, as disclosed, are applicable to reactor designs which increase the power density of the reactor without substantial burnup of high enrichment fuel elements: Firstly, by eliminating or minimizing the need for conventional neutron absorbing control elements, which when placed in a region of substatial fission power tend to depress the neutron flux and consequently the power of said region. Hence power peaks exist far from the control elements while valleys exist in the vicinity thereof, this unevenness in the power distribution significantly lowering the power density. The present invention, by minimizing the need for control elements in the power producing region tends to increase the average power density. Secondly, the instant invention is effective in increasing the power density through placement of spiked regions of high enrichment fuel within flux separating internal reflectors in portions of the reactor where the power tends to be low, e.g., at the outer edge of the reactor. With reference to FIGURE 4 of the drawings, the high enrichment regions 26, surrounded by internal reflectors 28, increase the power density in blanket regions or low enrichment regions 30. Thus, high enrichment regions 26, leaking neutrons into the power producing regions 30, raise the flux level in said power producing regions. Accordingly, the burnup takes place predominantly in those regions of the reactor with relatively unenriched fuel elements, the spiked regions having a low flux while providing excess neutron leakage to smooth out the power distribution and therefore increase the average power density.

Exemplary of the advantages to be gained by the use of flux separation design principles, the foregoing discussion has been primarily concerned with seed core reactors, i.e., reactors comprised of at least one seed region composed of high enrichment fuel elements arranged to maximize leakage into at least one blanket region composed of relatively low enrichment fuel elements. FIGURES 1–6 of the drawings illustrate such seed core reactors with the internal reflector incorporated therewithin.

In reiteration, the advantages of the seed-blanket design without the internal reflector innovation are principally as follows:

(1) Longer reactivity lifetime.
(2) Improved control characteristics.
(3) A substantial fraction of the power is produced in the low reactivity blanket region.
(4) Uranium–238 in the blanket region is converted to plutonium–239 by absorption of neutrons. This conversion is relatively efficient and contributes to a longer reactivity lifetime. The conversion ratio, i.e., the fraction of absorbed neutrons that are absorbed in uranium–238, is relatively high in the blanket of a seed core reactor.

Limitations inherent in seed-blanket designs as heretofore known are principally as follows:

(1) The power sharing between seed and blanket regions is approximately 50% to each region. Investigations have shown that it is not possible to greatly change the power sharing between blanket and seed by varying the design. For example, cutting the seed loading in half in some cases increases the blanket power by only 6%. Thus, a large fraction of the power is produced by the high enrichment fuel.

(2) The power density in the seed region is high because it consists of high enrichment fuel, and the thermal neutron flux in the seed is of the same general magnitude as that in the blanket. If the power level of the reactor is increased, the power density in the seed would exceed the heat removal capabilities of the seed volume. This limits the power density in the blanket to lower levels than would otherwise be attainable.

The net effect of these disadvantages is to sharply limit three of the areas of advantage of the seed-core design.

(a) The reactivity lifetime is not very greatly increased because a substantial part of the burnup takes place in the seed region.

(b) The effectiveness of the control rods in the seed region is not very much greater than it would be if the high enrichment elements were distributed uniformly throughout the core.

(c) A large fraction of the power is produced in the seed region. This fraction is not very different than it would be if the high enrichment fuel elements were distributed throughout the core.

For the purpose of disclosing the effectiveness realized through incorporation of internal reflectors for flux separation between seed and blanket regions, the following mathematical relationships are included herewith, the symbols used being defined as follows:

$L(S \rightarrow B)$ = the fraction of neutrons born in the seed which are absorbed in the blanket.
$L(B \rightarrow S)$ = the fraction of neutrons born in the blanket which are absorbed in the seed.
$L_{SO}$ = the fraction of neutrons born in the seed which leak out of the reactor.
$L_{BO}$ = the fraction of neutrons born in the blanket which leak out of the reactor.
$P_S$ = power level in the seed, in units of fissions per unit volume.
$V_S$ = volume of seed region.
$P_B$ = power level in the blanket, in units of fissions per unit volume.
$V_B$ = volume of blanket region.
$k_S$ = lattice multiplication factor of the seed region, i.e. fissions produced per absorption in the seed.
$k_B$ = lattice multiplication factor of the blanket region, i.e. fissions produced per absorption in the blanket.
$k$ = reactivity of the reactor configuration, i.e. neutrons produced per neutrons absorbed (or lost by leakage).

Conservation of neutrons in the blanket region requires that the following equation be satisfied:

$$P_S V_S L(S \rightarrow B) k_B + P_B V_B [1 - L_{BO} - L(B \rightarrow S)] k_B = k P_B V_B \quad (1)$$

Conservation of neutrons in the seed region requires that the following equation be satisfied:

$$P_S V_S [1 - L_{SO} - L(S \rightarrow B)] k_S + P_B V_B L(B \rightarrow S) k_S = k P_S V_S \quad (2)$$

In order for both of these equations to be simultaneously satisfied the following relation must hold:

$$\frac{P_S V_S}{P_B V_B} = \frac{k_B [L_{Bo} + L(B \rightarrow S)] + (k - k_B)}{k_B L(S \rightarrow B)} \quad (3a)$$

$$= \frac{k_S L(B \rightarrow S)}{L_{SO} + L(S \rightarrow B) - (k_S - k)} \quad (3b)$$

$k$ can be taken equal to unity for all situations of interest.

The effect of the (internal reflector) flux separation design can be expressed as follows:

$L(B \rightarrow S)$ is drastically decreased by the flux separator, while $L(S \rightarrow B)$ is increased, since the probability that a neutron thermalized in the blanket region will return to the seed is greatly diminished by the flux separator.

It is clear from equation (3b) that the ratio of seed power to blanket power is considerably decreased by the flux separator, since $L(B \rightarrow S)$ is much smaller than in a conventional seed-blanket reactor, and $L(S \rightarrow B)$ is larger.

We now consider the effect on reactivity. From equation (1) one can obtain $$k = \frac{P_S V_S}{P_B V_B} L(S \rightarrow B) k_B + [1 - L_{BO} - L(B \rightarrow S)] k_B \quad (3c)$$

The effect of the flux separator is to decrease the reactivity of a given seed-blanket configuration. The decrease of the power ratio tends to decrease $k$, while the decrease of $L(B \rightarrow S)$ tends to increase the reactivity, with the first effect outweighing the second. Hence, it is not necessary to insert absorber rods to hold down the initial excess reactivity, as required in conventional seed-blanket reactors, since the flux separator performs this function.

As will be further appreciated, variation of the internal reflector thickness can provide reactor control. That is, as the thickness thereof is decreased, $L(B \rightarrow S)$ increases and the power ratio (3b) increases. The net effect is to increase k, as shown in above equation (3c).

The internal reflector may be constructed of a single material or a combination of materials, or it may be comprised of superposed layers of the same or varied materials. The internal reflector should preferably be chemically inert and corrosion resistant even at high temperatures; should have good thermal conductivity properties to dissipate the heat of reactor radiation; and should be of substantial mechanical strength to maintain its integrity. Accordingly, an external cladding comprised of stainless steel or any other suitable material may be provided to afford these characteristics thereto.

The internal reflector will be a few neutron total mean free paths in thickness, and will therefore occupy a significant volume within the reactor core. Since it is desired to minimize the reactor core volume for economic reasons, minimization of the volume occupied by the internal reflector will also be desired. An internal reflector with some neutron absorption will tend to be thinner for a given number of total means free paths than one without absorption. Hence an optimum design for an internal reflector will include a material with some neutron absorption properties, though the material must be primarily a scatterer. Alternatively, the internal reflector may as above-stated, be a multilayer structure, with a thin layer of neutron absorbing material sandwiched within, or on one side, of the predominant scattering material.

Among the choice of internal reflector materials possessing the foregoing properties are the following metallic oxides: Calcium oxide or calcium hydroxide, magnesium oxide, lead oxide, aluminum oxide, a table of elements that may be utilized being given below:

TABLE II

| Element | Absorption, Mean free path, cm. | Scattering, Mean free path, cm. | Total, Mean free path, cm. |
|---|---|---|---|
| Beryllium | 806 | 1.16 | 1.16 |
| Beryllium oxide | 1,370 | 2.00 | 2.00 |
| Carbon | 3,845 | 2.60 | 2.60 |
| Lead | 179 | 0.75 | 0.75 |
| Scandium | 1.29 | 1.24 | 0.63 |
| Vanadium | 2.79 | 2.84 | 1.41 |
| Iron | 4.65 | 1.07 | .87 |
| Nickel | 2.38 | 0.63 | .495 |
| Copper | 3.19 | 1.64 | 1.08 |

The internal reflector material, as described heretofore, should possess good neutron scattering properties with relatively little absorption of neutrons and be further possessed of poor neutron moderating properties. However, a minimum amount of neutron absorption can be tolerated, and will be beneficial for the following reason. The mean free path values included above in Table II apply to thermal energy. The ratio of absorptions to scatterings in a material is given by $$\frac{\text{scattering means free path}}{\text{absorption mean free path.}}$$

Thus, where nickel is utilized as the internal reflector material, the ratio of absorptions to scatterings is approximately 1 in 4. Nickel has a particularly low total mean free path. A nickel internal reflector slab, e.g., 5 mean free paths thick giving a 10 to 1 flux ratio would be only one inch thick. Among materials with negligible absorption characteristics, beryllium gives a 10 to 1 flux ratio for a slab thickness of over two inches.

Figure 3:
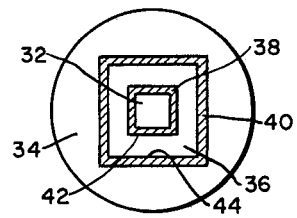
FIGURE 3 is a cross-sectional view of a cylindrical reactor core having two concentric rectilinear inner regions, both being surrounded by internal reflectors.

The seed region has been hereinabove referred to as an inner region, although it will be appreciated that the seed region may be arranged as a single outer region, or as several regions of high enrichment separated by blanket regions, or as an intermediate region separating two blanket regions, the latter embodiment being illustrated in FIGURE 3 of the drawings, wherein blanket regions 32 and 34 are seen separated by seed region 36, internal reflectors 38 and 40 being interposed between said seed and blanket regions. The internal reflectors 38 and 40, it will be understood, extend completely and tightly around the inner and outer peripheries 42, 44, respectively, of said seed region 36, to thereby reduce the flux and power therein.

The critical equation for a seed-blanket reactor with flux separators may be expressed as follows: where
$d$=neutron deficit in the blanket=$1-K_B$
$E$=neutron excess in the seed $$\frac{7 \text{ seed}}{7 \text{ blanket}} \cdot [k_B - 1]$$

where 7 is the number of fission neutrons produced per absorption in the respective region
$S$=surface area (normal to the radial direction) of the seed region.
$J_m$=thermal neutron current into the seed region from the blanket.

$$P_B \cdot V_B \cdot d = E \cdot S \cdot J_m \quad (4)$$

If $T$ is the thickness of the seed region annulus then $$J_m = \sigma_S \theta_S T \quad (5)$$

where
$\sigma_S$=thermal macroscopic absorption cross section of seed region.
$\theta_S$=average thermal neutron flux in the seed
$\sigma_B$=thermal macroscopic absorption cross section in the blanket region
$\theta_B$=average thermal neutron flux in the blanket
$R$=thermal flux ratio, blanket flux to seed flux
$P_S$=thermal flux ratio, blanket flux to seed flux
$P_S = \sigma_S \theta_S$
then $$J_m = \frac{1}{R}\theta_B = \frac{P_B}{R\sigma_B} \quad (6)$$

Substituting (5) into (4) the following is obtained, $$\frac{P_B}{P_S} = \frac{E}{d} \frac{ST}{V_B} \quad (7)$$

where $ST/V_B$ is the ratio of seed volume to blanket volume. The ratio of total power in seed to total power in blanket is then given from (7) as $$\frac{P_S \cdot ST}{P_B \cdot V_B} = \frac{d}{E} \quad (8)$$

This equation does not explicitly give the required value of R, i.e., the thermal flux ratio, for criticality. This form of the critical equation may be derived by substituting (6) into (4).

$$R = \frac{E}{d} \frac{1}{\sigma_B T} \quad (9)$$

Equating (5) and (6) the following is obtained, $$\frac{P_S}{P_B} = \frac{1}{R} \cdot \frac{1}{\sigma_B T} \quad (10)$$

Although these schematic relations do not explicitly introduce the finite size of the reactor core, it will be apparent that the finite size of the core can be taken into account by the standard and routine methods of reactor physics and that the criticality relations (8) and (9) hold schematically for finite-sized reactors.

The critical Equation (9) may be interpreted as follows: When R is greater than the value given by (9) the reactor is subcritical. When R is less than the value given by (9) the reactor is supercritical. In either event the power ratio given by (8) or (7) does not hold, since these equations depend on the use of a flux separator to give the R of Equation (9).

Typical design values of the seed-blanket reactor with flux separator, are given in the following Table III. This table also gives, for purposes of comparison, the corresponding figures for a conventional seed blanket design without flux separator. It is clear that the seed fuel elements, which are composed of an alloy of zirconium and enriched uranium in some conventional seed core designs, are much more highly enriched in the Flux Separator Design than in the conventional design. On the other hand the volume fraction of the seed occupied by water is much less for the Flux Separator Design.

TABLE III

| | Flux Separator Seed-Blanket | Conventional Seed-Blanket |
| --- | --- | --- |
| Ratio of U-235 density in fuel, seed fuel elements to blanket fuel elements. | Between 3 to 1 and 10 to 1, 7 to 1 (mean value). | 3 to 1. |
| Water to Fuel volume ratio: | | |
| Seed | 1 to 2 or 1 to 3 | 1 to 1. |
| Blanket | 3 to 1 | 3 to 1. |
| Thickness of seed region | About 6 inches | About 6 inches. |
| Power density ratio seed to blanket. | Between 0.3 to 1 and 1 to 1. | Greater than 3 to 1. |
| Ratio of mean thermal fluxes seed to blanket. | 1 to 10 | 1 to 1. |
| Fraction of total power produced in seed region. | 10% | 50%. |
| Core radius | 4 feet | 4 feet. |
| Radius of seed region | 2 feet | 2 feet. |

The blanket fuel elements, which are composed of low enrichment uranium oxide fuel in some conventional seed core designs, are not substantially different in the Flux Separator Design, wherein an internal reflector surrounds the seed region. The seed region itself is composed of one or two rows of fuel element sub-assemblies.

While the theory of flux separation in thermal reactors and preferred structural embodiments relating thereto have been set forth herein, it will be appreciated that additional experimental data later discovered may suggest variations in carrying out the invention disclosed herein. Accordingly such variations falling within the purview of this invention may be made without in any way departing from the spirit of the invention or sacrificing any of the attendant advantages thereof, provided, however, that such changes fall within the scope of the claims appended hereto.

What is claimed is:
1. In a nuclear reactor with fissions occurring predominantly at thermal energies, the combination comprised of first and second fuel regions, said first regions being formed of relatively high enrichment nuclear fuel elements and moderator material, said reactor having a maximum volumetric ratio of moderator material to fuel material in said first fuel regions of 1:2, said second fuel region being formed of relatively low enrichment nuclear fuel elements and moderator material, said reactor having a volumetric ratio of moderator material to fuel material in said second regions of at least 1:1, and internal reflector material interposed between and completely separating said first and second fuel regions, said reflector material being of thickness sufficient to maintain the thermal neutron flux within said first fuel regions adjacent said reflector material at a magnitude no greater than one-half the thermal neutron flux magnitude within said second fuel regions adjacent said reflector material.

2. A nuclear reactor according to claim 1 wherein the fuel elements of said first and second fuel regions include selected enrichment material from the group consisting of uranium 235, plutonium 239 and uranium 233, and wherein the enrichment material of said first fuel regions constitutes at least 10% of the uranium atoms of said first regions and wherein the enrichment material of said second fuel regions constitutes a maximum of 5% of the uranium atoms of said second regions.

3. A nuclear reactor according to claim 1 including means for varying the thickness of the internal reflector material.

4. A nuclear reactor according to claim 1 wherein said first fuel regions are circular of cross-section and disposed concentrically with respect to said second fuel regions.

5. A nuclear reactor according to claim 1 wherein said first fuel regions are cross-shaped of cross-section.

6. A nuclear reactor according to claim 1 wherein said first fuel regions are rectilinear of cross-section.

7. A nuclear reactor according to claim 1 wherein said first fuel region is irregular of cross-section.

8. A nuclear reactor according to claim 1 wherein the thickness of the internal reflector material is within the range of 1 to 10 neutron mean free paths of the internal reflector material.

References Cited by the Examiner

UNITED STATES PATENTS

| | | | |
|---|---|---|---|
| 2,852,456 | 9/1958 | Wade | 176—33 |
| 2,870,076 | 1/1959 | Koch | 176—17 |
| 2,982,709 | 5/1961 | Miles | 176—17 |
| 2,999,059 | 9/1961 | Treshow | 204—193.2 |
| 3,000,802 | 9/1961 | Worn et al. | 204—154.2 |
| 3,026,258 | 3/1962 | Huet | 176—33 X |
| 3,036,964 | 5/1962 | Horning | 176—33 |
| 3,060,111 | 10/1962 | Sherman et al. | 204—193.2 |

FOREIGN PATENTS 853,269  11/1960  Great Britain.

LEON D. ROSDOL, *Primary Examiner.*

REUBEN EPSTEIN, CARL D. QUARFORTH,
*Examiners.*

M. R. DINNIN, *Assistant Examiner.*